United States Patent
Hoerner (10) Patent No.: US 9,198,356 B2
(45) Date of Patent: Dec. 1, 2015

(54) HAYMAKING MACHINE WITH ROTOR BLOCKING SYSTEM

(75) Inventor: Yannick Hoerner, Erstroff (FR)

(73) Assignee: KUHN S.A., Saverne (FR)

( * ) Notice: Subject to any disclaimer, the term of this patent is extended or adjusted under 35 U.S.C. 154(b) by 228 days.

(21) Appl. No.: 13/982,362

(22) PCT Filed: Feb. 15, 2012

(86) PCT No.: PCT/FR2012/050324
§ 371 (c)(1),
(2), (4) Date: Jul. 29, 2013

(87) PCT Pub. No.: WO2012/110743
PCT Pub. Date: Aug. 23, 2012

(65) Prior Publication Data
US 2013/0312383 A1    Nov. 28, 2013

(30) Foreign Application Priority Data

Feb. 17, 2011 (FR) .................................. 11 51307

(51) Int. Cl.
| | | |
|---|---|---|
| A01D 76/00 | (2006.01) |
| A01D 78/00 | (2006.01) |
| A01D 80/00 | (2006.01) |
| A01D 84/00 | (2006.01) |
| A01D 78/10 | (2006.01) |

(52) U.S. Cl.
CPC ........ *A01D 78/1014* (2013.01); *A01D 78/1007* (2013.01)

(58) Field of Classification Search
CPC ........... A01D 78/1007; A01D 78/1028; A01D 78/1035; A01D 78/105; A01D 78/001
USPC ............................................ 56/385, 370, 15.8
See application file for complete search history.

(56) References Cited

U.S. PATENT DOCUMENTS

| | | | | |
|---|---|---|---|---|
| 3,484,803 A | * | 12/1969 | Billhymer et al. | ............... 56/377 |
| 3,546,867 A | * | 12/1970 | Hauser-Lienhard | ............ 56/370 |
| 3,834,142 A | * | 9/1974 | Johnston et al. | ................ 56/377 |

(Continued)

FOREIGN PATENT DOCUMENTS

| | | | | |
|---|---|---|---|---|
| EP | 503396 A1 | * | 9/1992 | ............. A01B 63/00 |
| EP | 0 954 956 | | 11/1999 | |

(Continued)

OTHER PUBLICATIONS

International Search Report Issued May 25, 2012 in PCT/FR12/050324 Filed Feb. 15, 2012.

*Primary Examiner* — Árpád Fábián-Kovács
(74) *Attorney, Agent, or Firm* — Oblon, McClelland, Maier & Neustadt, L.L.P.

(57) ABSTRACT

A haymaking machine, or a windrower, including a support structure including a main beam on which is articulated at least one lateral arm supporting at least one windrowing rotor. The rotor is connected to a support device forming an interface with a support mounted on the lateral arm. The support device makes it possible for the rotor to displace to follow movements of the terrain when the machine is in operation and is in a work position. The support device includes an adjustment system allowing to limit movements of the rotor in the work position and to block movements of the rotor in other positions, and the adjustment system allowing to limit the movements of the rotor includes a control including a hydraulic jack.

20 Claims, 9 Drawing Sheets

(56) References Cited

U.S. PATENT DOCUMENTS

| | | | |
|---|---|---|---|
| 3,948,028 A * | 4/1976 | Reber | 56/365 |
| 4,149,364 A * | 4/1979 | Aron | 56/366 |
| 4,275,552 A * | 6/1981 | DeCoene | 56/370 |
| 4,345,422 A * | 8/1982 | Amstutz | 56/370 |
| 4,914,901 A * | 4/1990 | Aron | 56/370 |
| 4,936,390 A * | 6/1990 | Anderson et al. | 172/5 |
| 5,024,053 A * | 6/1991 | Aron | 56/367 |
| 5,060,465 A * | 10/1991 | Jerome | 56/367 |
| 5,199,252 A * | 4/1993 | Peeters | 56/377 |
| 5,337,546 A * | 8/1994 | Sieling | 56/365 |
| 5,377,482 A * | 1/1995 | Knigge | 56/370 |
| 5,502,959 A * | 4/1996 | Hansen | 56/370 |
| 5,743,075 A * | 4/1998 | Aron et al. | 56/366 |
| 5,806,291 A * | 9/1998 | Lehman et al. | 56/15.2 |
| 5,918,451 A * | 7/1999 | Vonesch | 56/365 |
| 5,918,452 A * | 7/1999 | Kelderman | 56/377 |
| 6,220,008 B1 * | 4/2001 | Rowse et al. | 56/377 |
| 6,272,826 B1 * | 8/2001 | Menichetti et al. | 56/367 |
| 6,467,249 B2 * | 10/2002 | Demanet | 56/377 |
| 6,543,212 B2 * | 4/2003 | Tonutti | 56/375 |
| 8,146,338 B1 * | 4/2012 | Cicci et al. | 56/377 |
| 2001/0025473 A1 | 10/2001 | Demanet | |
| 2005/0172603 A1 | 8/2005 | Breneur | |
| 2007/0163223 A1 * | 7/2007 | Hruska et al. | 56/375 |

FOREIGN PATENT DOCUMENTS

| | | |
|---|---|---|
| EP | 1 142 468 | 10/2001 |
| EP | 2 253 186 | 11/2010 |
| FR | 2 838 284 | 10/2003 |
| FR | 2 875 378 | 3/2006 |

* cited by examiner

FIG. 4

HAYMAKING MACHINE WITH ROTOR BLOCKING SYSTEM

BACKGROUND OF THE INVENTION

1. Field of the Invention

The invention relates to a haymaking machine, in particular a windrower for plants lying on the ground.

Windrowers are suited to the harvesting of cut fodder lying on the ground, these machines provided with a rotor and movable tools make it possible to gather the fodder in windrows intended to be subsequently picked up for example by means of presses.

2. Description of the Related Art

Windrowers comprise a support structure including a main beam on which is articulated at least one lateral arm which is movable around an axis by a jack and which carries at least one windrowing rotor. Windrowers usually comprise several rotors staggered along the support structure so as to cover a large work area during the movement of the agricultural machine on a field or a meadow.

Agricultural machines operate on all types of terrain, therefore the tools and equipment which are used by farmers must adapt themselves depending on the relief of these terrains.

The windrower is brought to work in fields which may be sloping or on irregular terrains, or else comprising obstacles. To permit this work, the rotor of the windrower usually has a certain latitude of movement so as to follow the contours of the terrain, devices are provided, in addition, to raise the tools.

The latitude of movement of the rotor in operation is currently not adjustable and the displacements of the work tool are not controlled in a precise manner. Consequently, the articulation between the support arm of the rotor and the rotor is subjected to great stresses, there is thus a need to control the displacement of the rotor during work and during movements.

When the work in the field requires to raise the rotor, to pass an obstacle for example, or when the rotor is folded to the vertical for transport outside the work area, it is preferable if there is no unexpected movement which could cause damage for the articulation and the rotor itself if the rotor came to run into the frame. A problem thus appears which is to block the displacement of the rotor when the latter is not in work position.

BRIEF SUMMARY OF THE INVENTION

The invention therefore has the aim of solving these main difficulties by proposing a blocking device of the possible displacements of the rotor when the latter is situated outside the work configuration.

Thus, the invention relates to a haymaking machine, more particularly a windrower, comprising a support structure including a main beam on which is articulated at least one lateral arm supporting at least one windrowing rotor, which rotor is connected to a support device forming an interface with a support mounted on the lateral arm, which support device allows the rotor to displace so as to follow the movements of the terrain when the machine is in operation and is in work position, the machine being characterized in that the support device comprises an adjustment system making it possible to limit the movements of the rotor in the work position and to block them in other positions, and in that the adjustment system allowing to limit the movements of the rotor comprises on one hand a control means including at least one hydraulic jack and on another hand a connecting device movable by the at least one hydraulic jack.

The advantages of the device according to the invention are multiple:

the displacements of the rotor at work are controlled, and damped to a certain extent, by the hydraulic jack or jacks, which has the effect of reducing the mechanical stresses on the articulation between the support arm of the rotor and the rotor, apart from the work position, the hydraulic jack or jacks can block any unexpected movement of the rotor, which brings a great safety for the transport of the machine, the synchronisation of the hydraulic jack or jacks with a folding jack of the support arm of the rotor makes it possible to avoid accidents, in particular that the rotor strikes the main beam, the synchronisation also allows, with a single command on the control cabin, to actuate two separate elements, which is favourable in particular for passing obstacles on a field and prevents possible errors by the driver in the scheduling of the commands of the different jacks, the jacks are synchronised and the different elements are positioned such that an intermediate position is able to be realized in which the rotor is substantially parallel above the ground, raised for example for passing an obstacle, whilst being immobilised with regard to displacement to prevent unexpected movements.

BRIEF DESCRIPTION OF THE SEVERAL VIEWS OF THE DRAWINGS

Other features and advantages of the invention will emerge from the following description with regard to the attached drawings, which are given only by way of non-restrictive examples.

DETAILED DESCRIPTION OF THE INVENTION

Figure 1:
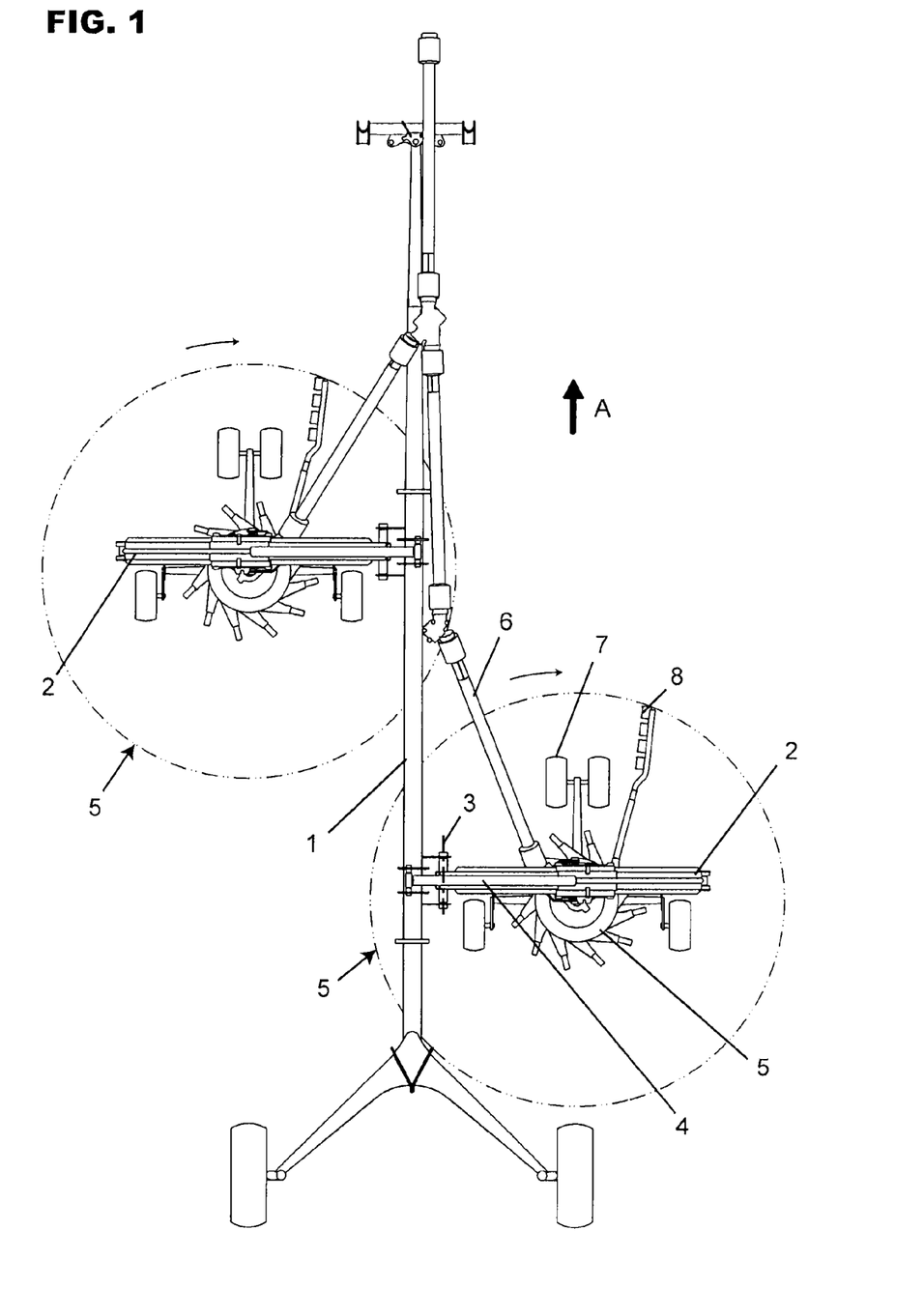
FIG. 1 is an overall view of a windrower according to the invention.

As is represented in FIG. 1, a windrower for plants lying on the ground according to the invention comprises a support structure including a main beam (1) on which is articulated at least one lateral arm (2) which is movable around a horizontal axis (3). The lateral arm (2) is movable around the axis (3) by means of a folding jack (4).

The folding jack (4) has the action of unfolding and folding the lateral support arm (2) of the windrowing rotor (5) between a transport position in which the lateral arm (2) is substantially vertical, and a work position in which it is inclined towards the ground. The lateral arm (2) can, in addition, be moved towards an elevated position in which the rotor (5) is raised from the ground. This elevated position is situated between the work position and the transport position and it makes it possible, for example, to passing over a windrow.

As is illustrated in FIG. 1, the windrower comprises in a conventional manner transmission means (6) allowing to drive a portion of each rotor (5) in rotation around a substantially vertical axis in work position, which axis carries a wheel-train (7) which supports the rotor (5). The different tools (8) carried by the rotor (5) are arranged on arms mounted in a central casing which turns around the substantially vertical axis.

The tools (8), which are usually forks, gather together the cut fodder lying on the ground in windrows which can then be picked up by another machine. In a known manner, several rotors are arranged on either side of the main beam (1) to cover a large area of the field and to limit the number of windrows to be collected in the following step.

Figure 2:
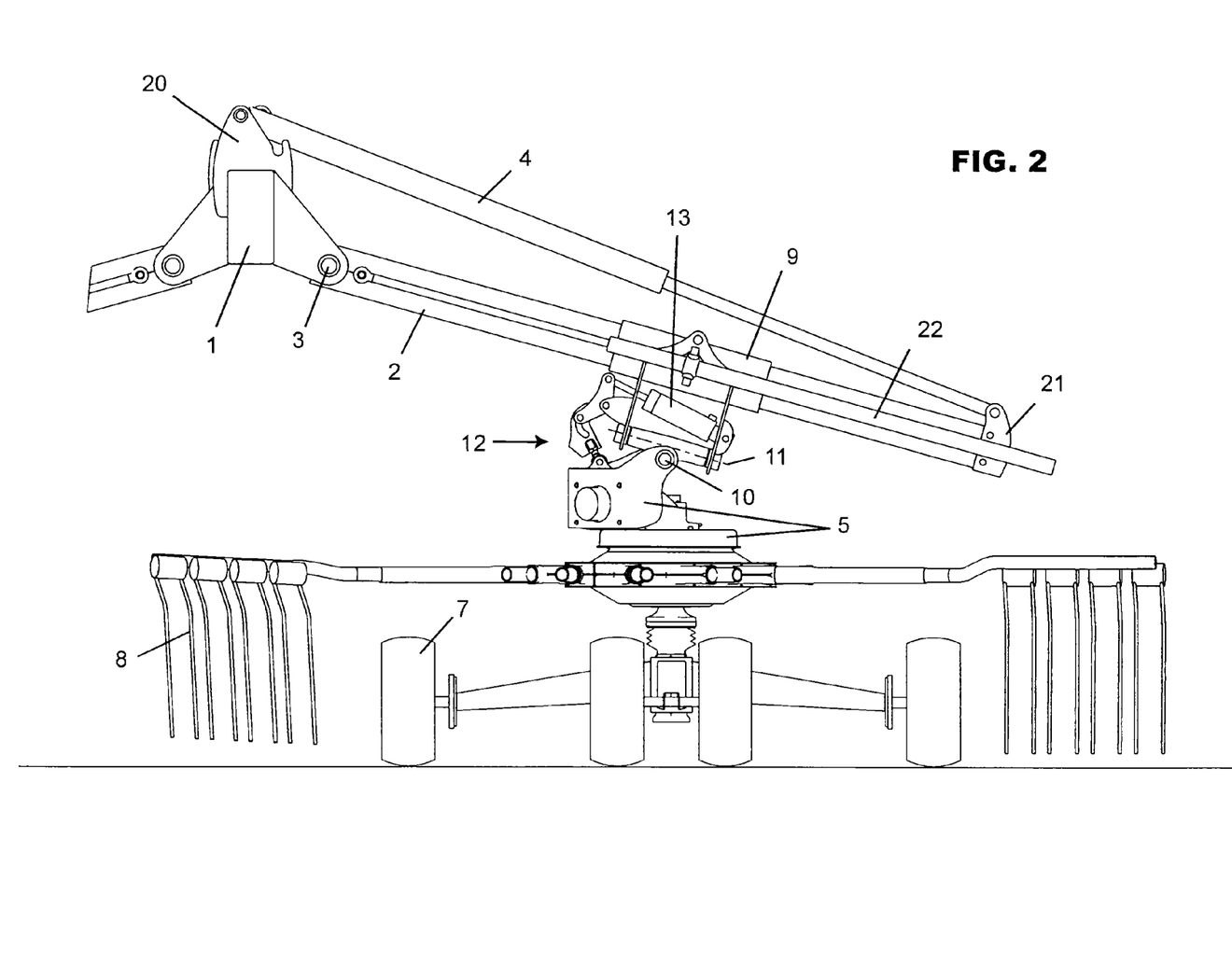
FIG. 2 shows on a larger scale a rotor according to a first variant embodiment, in work position.

FIG. 2 shows on a larger scale a rotor (5) in work position. This rotor (5) can pivot around a first axis (10) and a second axis (11) which connect it to a support (9) so as to follow the differences in level of the ground. The support (9) is movable on the corresponding lateral arm (2) by means of a hydraulic jack (22).

According to the invention, the displacements of the rotor (5) can be carried out in the work position around the first axis (10) and the second axis (11) which are substantially perpendicular, the first axis (10) being situated in a plane parallel to the ground and oriented in the direction of advance (A) of the machine, the second axis (11) being perpendicular to the direction of advance and being able to be more or less inclined with respect to the horizontal when the machine is in work position.

As is represented in the different figures, the rotor (5) is connected to the support (9) by a support device (12) comprising the first axis (10) and the second axis (11), so as to make the displacements allowing the movements of the terrain to be followed when the machine is in operation and is in work position possible. According to the invention, the machine is characterized in particular in that the support device (12) comprises an adjustment system allowing to limit the movements of the rotor (5) around the first axis (10) and the second axis (11) in the work position and to block them in other positions or any other position.

Figure 11:
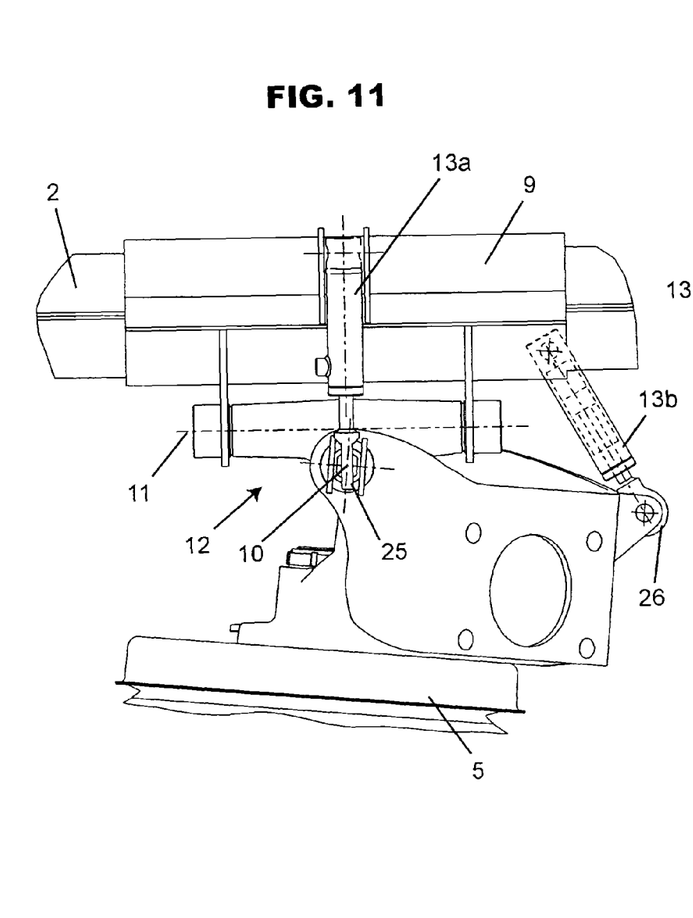
FIG. 11 shows a side view of the adjusting device according to a fourth variant embodiment.
Figure 12:
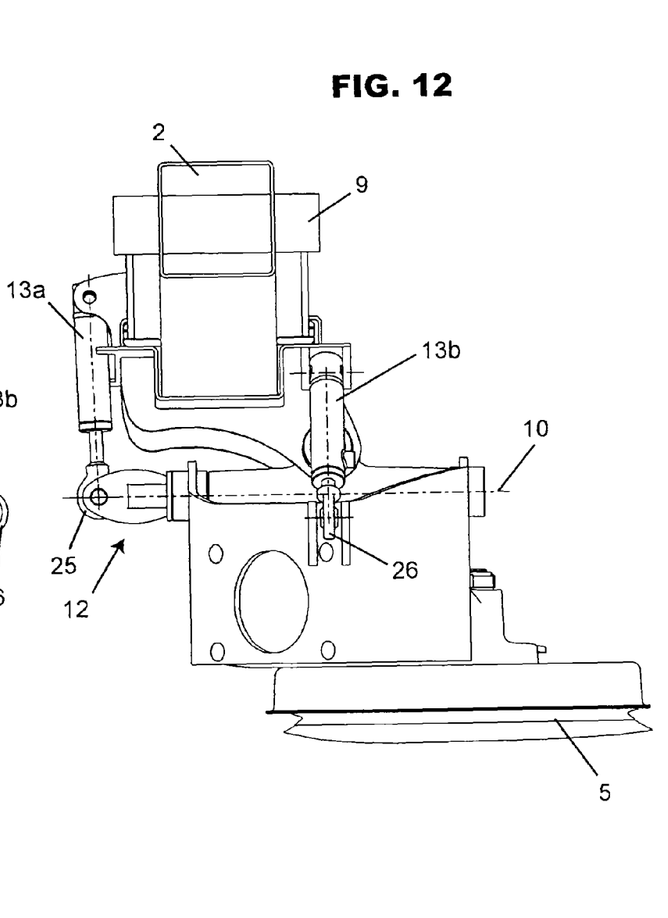
FIG. 12 shows a front view of the adjusting device according to the fourth variant embodiment.

According to the invention, the adjustment system allowing to limit the movements of the rotor (5) comprises on one hand a control means including at least one hydraulic jack (13, 13a, 13b) and on another hand a connecting device movable by the at least one hydraulic jack (13, 13a, 13b). FIGS. 2 to 10 and also 13 and 14 relate to variant embodiments including a single hydraulic jack (13), whilst FIGS. 11 and 12 illustrate a variant embodiment having recourse to two hydraulic jacks (13a, 13b).

According to an important feature of the invention, the at least one hydraulic jack (13, 13a, 13b) is connected on one hand to the rotor (5) by means of the connecting device, and on another hand to the support (9).

Figure 5:
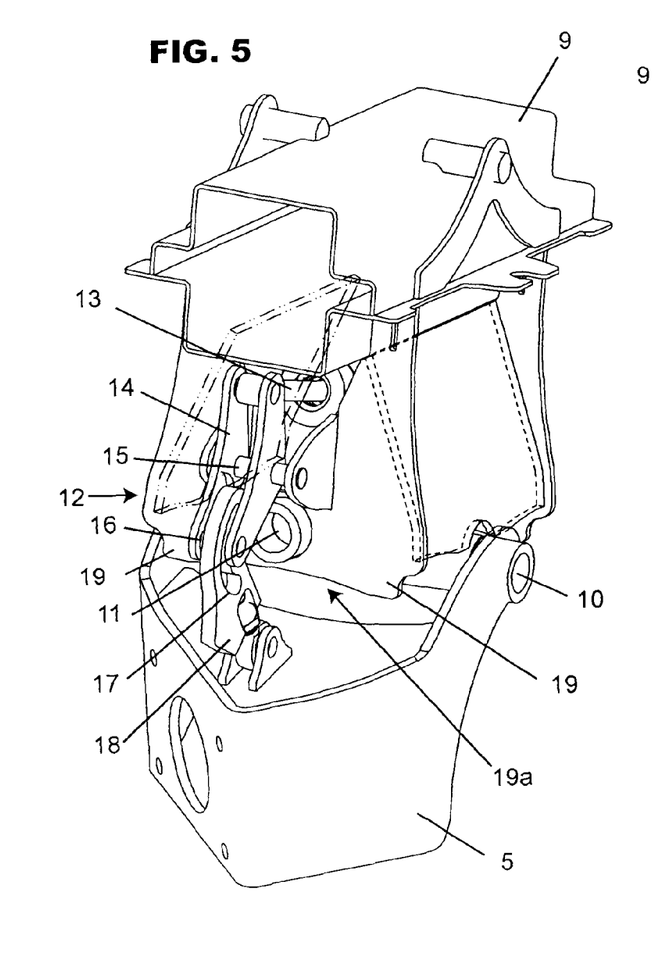
FIG. 5 illustrates a front view of the adjusting device according to the first variant embodiment.
Figure 6:
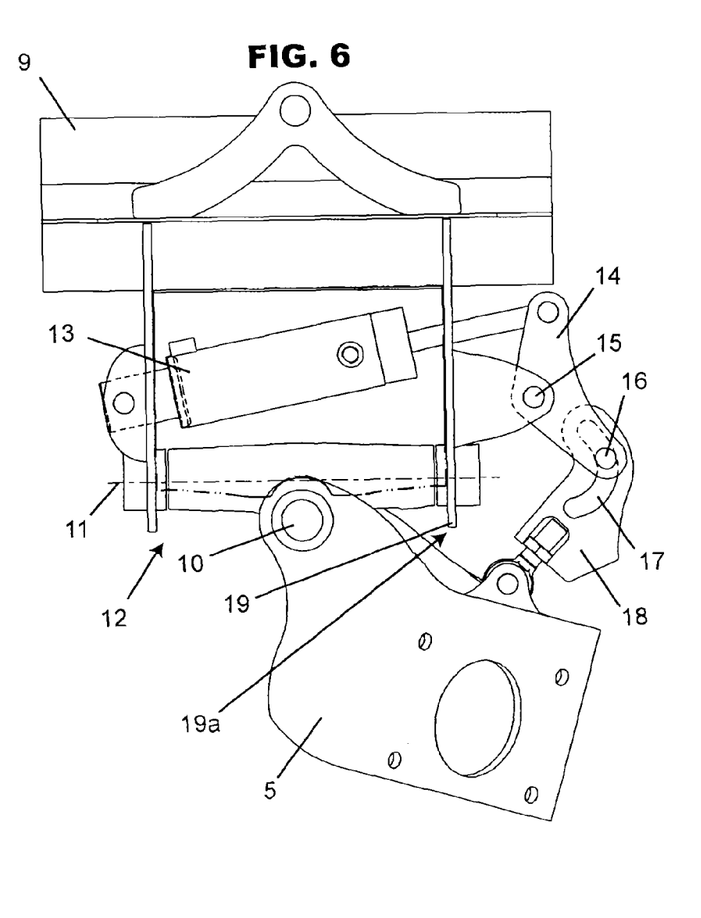
FIG. 6 shows a side view of the adjusting device according to the first variant embodiment.

In the first variant embodiment, and as is principally detailed in FIGS. 5 and 6, the connecting device comprises a rocker (14) articulated on an axis (15) of the support device (12). The rocker (14) is, in addition, connected to the hydraulic jack (13) and is able to pivot around the axis (15) under the action of the hydraulic jack (13).

The rocker (14) additionally comprises an axis (16) which is engaged in a housing (17) of oblong shape provided in a lug (18) articulated on the rotor (5) and which makes it possible to limit the pivoting movements around the first axis (10).

In this variant embodiment, the adjustment system comprises a stop means (19a) between the rotor (5) and the support (9) to limit the pivoting movements around the second axis (11), which stop means (19a) comprises two stops (19).

When the hydraulic jack (13) is in unfolded position, as is illustrated in FIGS. 5 and 6, i.e. when the rotor (5) is in work position, the axis (16) is situated in a median position in the housing (17), a displacement on either side of this position is therefore possible. Therefore, a limited rotational movement can occur around the first axis (10), making it possible to follow the contours of the terrain.

Likewise in this position, the rotor (5) can also have at its disposal a latitude of movement around the second axis (11), which consequently allows a possible displacement in the three spatial dimensions.

Figure 3:
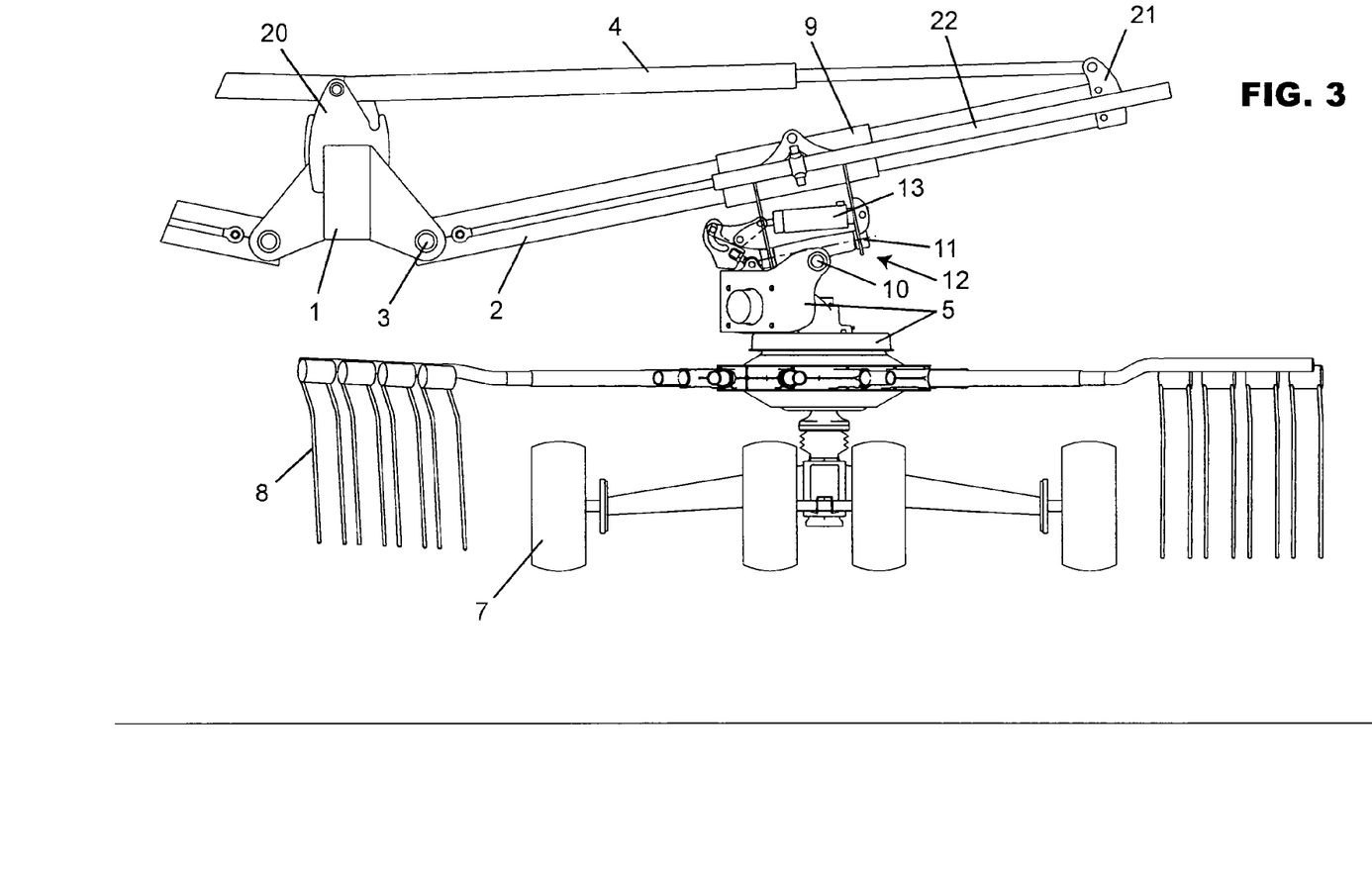
FIG. 3 illustrates a rotor according to the first variant embodiment, in a raised position in which it is partially raised from the ground, in partial folding position to pass above an obstacle or for manoeuvres at the end of the plot.
Figure 4:
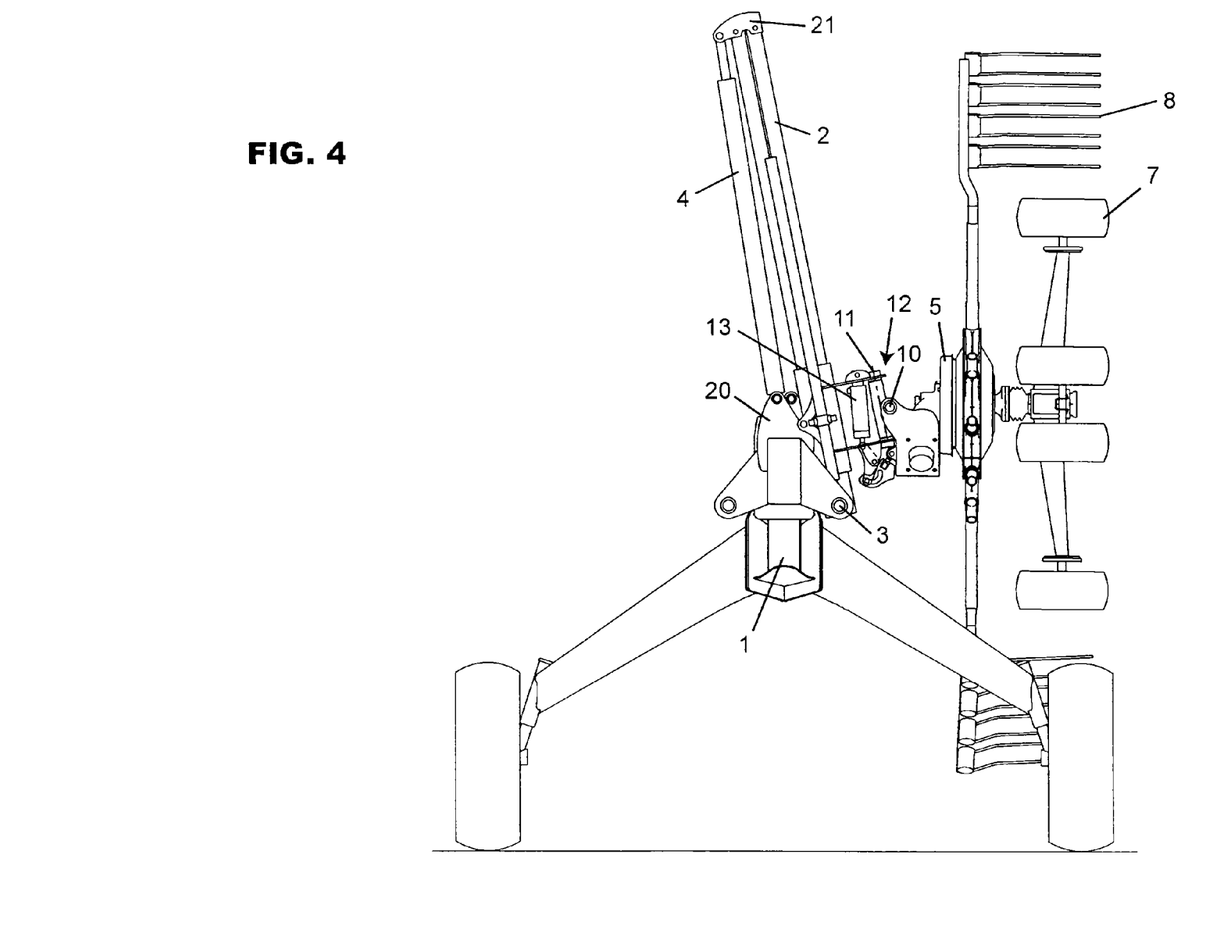
FIG. 4 shows a rotor according to the first variant embodiment, in transport position. The rotor is raised in a vertical position with the lateral arm.

The hydraulic jack (13) is, for example, a single-acting jack controlled under pressure when it is to shorten. When the hydraulic jack (13) is brought into folded position, in contraction, as is illustrated in FIGS. 3 and 4, the rocker (14) is pivoted until the axis (16) arrives at the end of its course in the housing (17) and pivots the rotor (5) upwards around the first axis (10). At this moment, no further displacement is possible around the first axis (10).

The rising of the rotor (5) in the direction of the support (9) also has the effect of bringing the stops (19), provided on the support device (12), in contact with the upper part of the rotor (5), locking in this action the possible rotation around the second axis (11).

The action of the hydraulic jack (13) in contraction thus has the effect of causing the rotor (5) to pivot in the direction of the main beam (1) and of simultaneously blocking the two possible displacements of the rotor (5) around the first axis (10) and the second axis (11).

Figure 7:
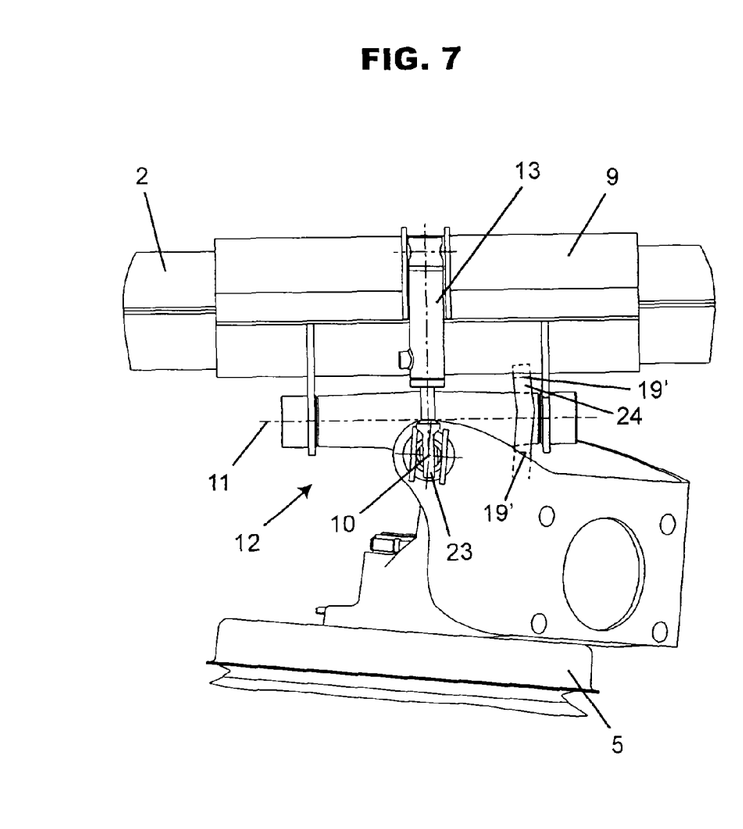
FIG. 7 shows a side view of the adjusting device according to a second variant embodiment.
Figure 8:
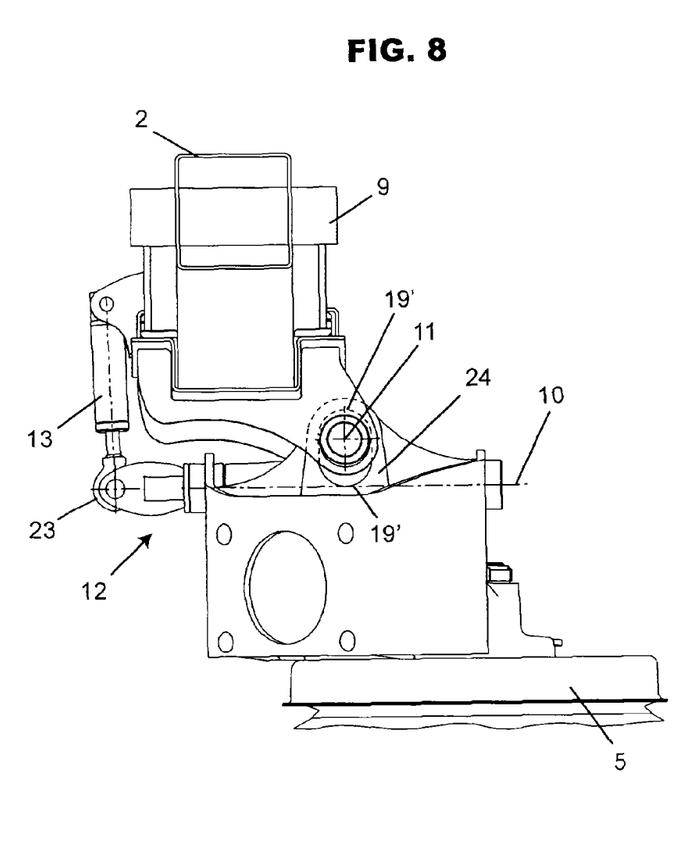
FIG. 8 shows a front view of the adjusting device according to the second variant embodiment.
Figure 9:
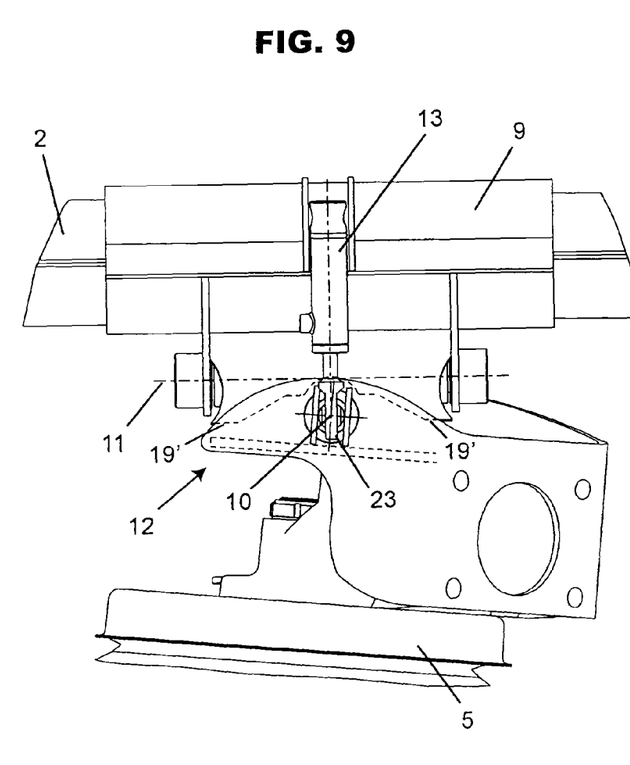
FIG. 9 shows a side view of the adjusting device according to a third variant embodiment.
Figure 10:
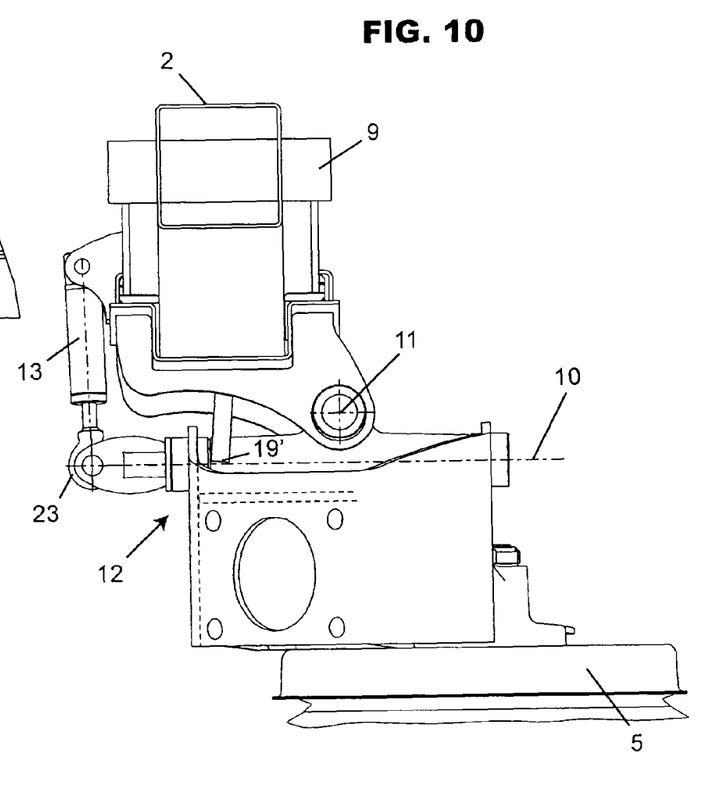
FIG. 10 shows a front view of the adjusting device according to the third variant embodiment.

In the second and third variant embodiments illustrated by FIGS. 7 to 10, the connecting device is formed by an articulation (23). These variant embodiments provide for the use of a single hydraulic jack (13) and the latter is connected to the rotor (5) by the articulation (23). The articulation (23) is preferably formed by a ball joint. In addition, the hydraulic jack (13) is arranged in a plane passing through the first axis (10). In these two variant embodiments, the adjustment system comprises two stops (19') between the rotor (5) and the support (9) to limit the pivoting movements around the first axis (10). In the second variant embodiment, as is represented in FIGS. 7 and 8, the second axis (11) can move in a limited manner within an oblong hole formed in a lug (24) which is rigidly fastened to the rotor (5), the ends of the oblong hole forming the two stops (19'). In the third variant embodiment represented in FIGS. 9 and 10, the support (9) comprises two faces forming the stops (19') and the rotor (5) can come in contact with one or other of these faces when it pivots around the first axis (10). The stops (19') are designed to allow a sufficient pivoting of the rotor (5) around the first axis (10) during work, so as to guarantee a good following of the terrain.

The hydraulic jack (13) is, for example, a single-acting jack controlled under pressure when it is to shorten. During work, the hydraulic jack (13) is floating, i.e. it is not controlled under pressure and it can therefore freely lengthen and shorten itself as a function of the movements of the rotor around the second axis (11). The hydraulic jack (13) can be designed such that during work, the pivoting of the rotor around the second axis (11) does not bring the hydraulic jack (13) into its maximum lengthening position nor into its maximum shortening position. Alternatively, the hydraulic jack (13) can be designed such that during work it can come into its end-of-course positions so as to limit the pivoting movements of the rotor (5) around the second axis (11). During work, the rotor (5) has, furthermore, at its disposal a latitude of movement around the first axis (10), which consequently allows a possible displacement in the three spatial dimensions.

When the hydraulic jack (13) is brought into its shortened position, in contraction, it has the effect of causing the rotor (5) to pivot around the second axis (11) and no further displacement is possible around the second axis (11). In the second variant embodiment, as can be deduced from FIG. 7, when the lateral arm (2) is pivoted from the work position towards the elevated position or towards the transport position, the own load of the rotor (5) brings about a movement of the axis (11) within the oblong hole and the axis (11) comes to rest against the lower stop (19'), the furthest away from the support arm (2). As can be seen from FIG. 9, the shortening of the hydraulic jack (13) causes, in the third variant embodiment, a placing in abutment of the rotor (5) against the stops (19').

In the fourth variant embodiment illustrated by FIGS. 11 and 12, the connecting device is formed by articulations (25, 26). The control means comprises a first jack (13a) connected to the rotor (5) by the articulation (25) and also a second jack (13b) connected to the rotor (5) by the articulation (26). The articulations (25, 26) are preferably formed by ball joints.

This fourth variant embodiment preferably makes provision that the first hydraulic jack (13a) is arranged in a plane passing through the first axis (10) and that the second hydraulic jack (13b) is arranged in a plane passing through the second axis (11).

The first and second hydraulic jacks (13a, 13b) are, for example, single-acting jacks controlled under pressure when they are to shorten. During work, the first and second hydraulic jacks (13a, 13b) are floating, i.e. they are not controlled under pressure and they can therefore freely lengthen and shorten as a function of the movements of the rotor around the first axis (10) and the second axis (11).

The first hydraulic jack (13a) can be designed such that, during work, the pivoting of the rotor around the second axis (11) does not bring the first hydraulic jack (13a) into a position of maximum lengthening nor into a position of maximum shortening. Alternatively, the first hydraulic jack (13a) can be designed such that, during work, it can come into its end-of-course positions so as to limit the pivoting movements of the rotor (5) around the second axis (11). The second hydraulic jack (13b) can be designed such that, during work, the pivoting of the rotor around the first axis (10) does not bring the second hydraulic jack (13b) into a position of maximum lengthening nor into a position of maximum shortening. Alternatively, the second hydraulic jack (13b) can be designed such that, during work, it can come into its end-of-course positions so as to limit the pivoting movements of the rotor (5) around the first axis (10). During work, the rotor (5) therefore has at its disposal a certain latitude of movement around the first axis (10) and the second axis (11), which consequently allows a possible displacement in the three spatial dimensions.

When the first hydraulic jack (13a) is brought into shortened position, in contraction, it has the effect of causing the rotor (5) to pivot around the second axis (11) and no further displacement is possible around the second axis (11). When the second hydraulic jack (13b) is brought into shortened position, in contraction, it has the effect of causing the rotor (5) to pivot in the direction of the main beam (1) around the first axis (10) and no further displacement is possible around the first axis (10). Thus, the action of the first and second hydraulic jacks (13a, 13b) in contraction blocks simultaneously the two possible displacements of the rotor (5) around the first axis (10) and the second axis (11).

Figure 13:
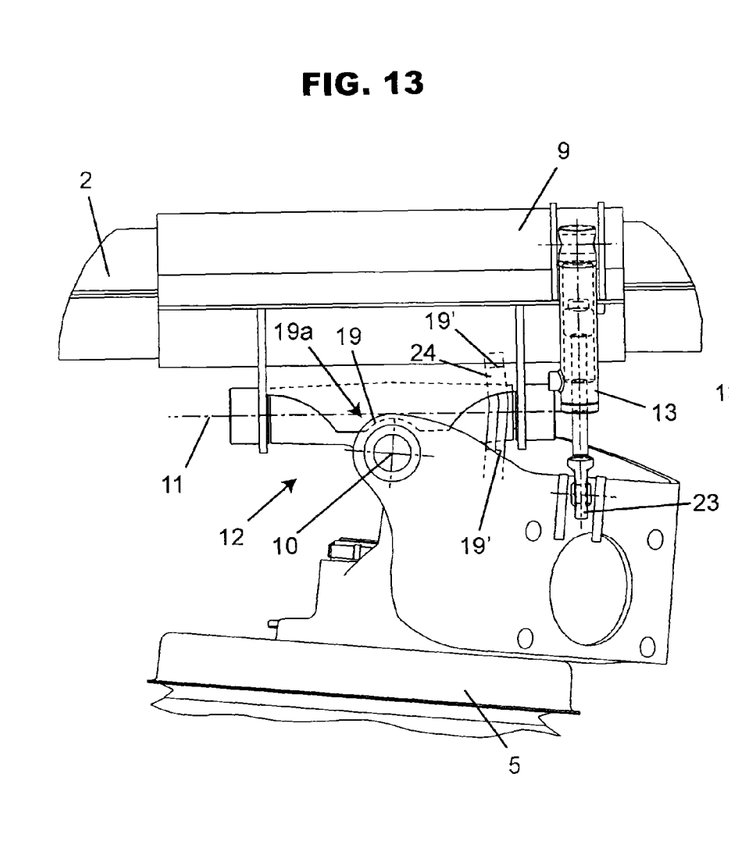
FIG. 13 shows a side view of the adjusting device according to a fifth variant embodiment.
Figure 14:
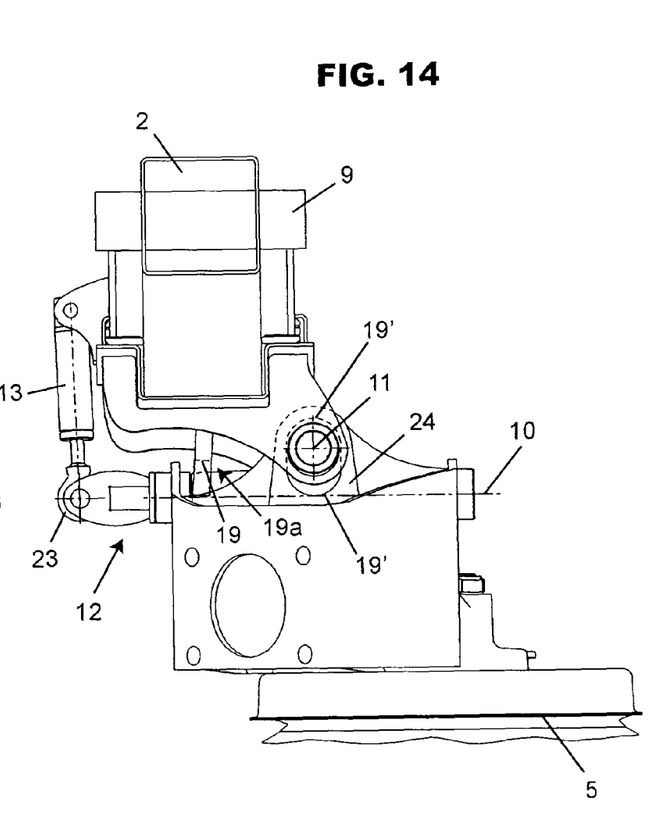
FIG. 14 shows a front view of the adjusting device according to the fifth variant embodiment.

In the fifth variant embodiment illustrated by FIGS. 13 and 14, the connecting device is formed by an articulation (23). This variant embodiment provides for the use of a single hydraulic jack (13) and the latter is connected to the rotor (5) by the articulation (23). The articulation (23) is preferably formed by a ball joint. In addition, the hydraulic jack (13) is arranged in an oblique plane with respect to the direction of advance (A). With the machine being viewed from above, this plane forms with a plane parallel to the direction of advance (A) an angle comprised between approximately 10° and 80°, for example approximately 45°.

In this variant embodiment, the adjustment system comprises two stops (19') situated between the rotor (5) and the support (9) so as to limit the pivoting movements around the first axis (10). In addition, the adjustment system comprises a stop means (19a) comprising a stop (19) situated between the rotor (5) and the support (9) so as to limit the pivoting movements around the second axis (11). The second axis (11) can move in a limited manner within an oblong hole formed in a lug (24) rigidly fastened to the rotor (5), the ends of the oblong hole forming the two stops (19'). The stop (19) is formed by a bearing face rigidly fastened to the support (9) against which the first axis (10) can come in contact.

The hydraulic jack (13) is, for example, a single-acting jack controlled under pressure when it is to shorten. During work, the hydraulic jack (13) is floating, i.e. it is not controlled under pressure and it can therefore freely lengthen and shorten as a function of the movements of the rotor around the first axis (10) and the second axis (11). During work, the rotor (5) therefore has at its disposal a possible displacement in the three spatial dimensions.

When the hydraulic jack (13) is brought into shortened position, in contraction, it has the effect, owing to its positioning in an oblique plane, of causing the rotor (5) to pivot in the direction of the main beam (1) around both the first axis (10) and the second axis (11). The first axis (10) then comes to rest against the stop (19) whilst the second axis (11) comes to rest against the lower strop (19'), the furthest away from the support arm (2). The result of this is that no further displacement is possible around the first axis (10) and the second axis (11).

The support (9) can slide under the action of the hydraulic jack (22) along the lateral arm (2) so as to position the rotor (5) as favourably as possible according to the number of rotors used and the desired configuration for work.

FIG. 3 shows a rotor in elevated position for passing over an obstacle or for manoeuvres at the end of the plot. In this position, the hydraulic jack (13) and the rocker (14) are actuated to keep the rotor (5) immobile in a substantially horizontal position which is intermediate between the work position and the transport position. In the second and third variant embodiments, this substantially horizontal elevated position can be obtained by designing the stops (19'), against which the rotor then comes to rest, in a suitable manner. In the fourth variant embodiment, the first and second hydraulic jacks (13a, 13b) are actuated to keep the rotor (5) immobile in this substantially horizontal position. In the fifth variant embodiment, the rotor (5) is kept immobile in this substantially horizontal position by actuating the hydraulic jack (13).

FIG. 4 shows the rotor in transport position. The rotor (5) is raised and the lateral arm (2) is in a substantially vertical position. In addition, the rotor (5) is moved along the lateral arm (2) towards the main beam (1) so as to reduce the height of the machine.

The passage between the work position, the intermediate position and the transport position is carried out under the action of the folding jack (4). The positioning of this jack (4) with respect to the main beam (1) and with respect to the lateral arm (2) is readily visible in FIGS. 2 to 4.

Thus, according to the invention, the folding jack (4) of the lateral support arm (2) of the rotor (5) is arranged between a connecting element (20) with the main beam (1) and substantially the exterior end (21) of the lateral arm (2), so as to allow the movement of the lateral arm (2) between a position inclined towards the ground, the work position, and a transport position in which the lateral arm (2) is situated more or less vertically with respect to the ground, the movement being carried out in a rotation around the axis (3).

Advantageously, the folding jack (4) and the hydraulic jack or jacks (13, 13a, 13b) of the control means are synchronised so that the movement of the lateral arm (2) towards the vertical position brings about a movement in contraction of the hydraulic jack or jacks (13, 13a, 13b) allowing the blocking of the possible displacements of the rotor (5).

Owing to the synchronisation, the partial folding of the lateral arm (2) to bring the folding jack (4) into a substantially horizontal position with respect to the ground leads to a contraction of the hydraulic jack or jacks (13, 13a, 13b) to bring the rotor (5) in a likewise substantially horizontal position, raised above the ground, so as to allow, for example, to pass over an obstacle.

The synchronisation also makes it possible to be obtain that the movement of the lateral arm (2) towards the work position, by lengthening of the hydraulic jack (4), brings about a movement in lengthening of the hydraulic jack or jacks (13, 13a, 13b) in order to unblock the rotor (5) as soon as it arrives in the work position.

Several variants are possible; the windrower can in particular comprise a variable number of rotors (5) and tools (8) of different types, the dimensions of the rotors (5) can be of greater or less size and they can be placed at a greater or less height with respect to the ground, without departing from the scope of the invention.

As regards the adjustment system making it possible to limit the movement of the rotor (5), the different parts can be shaped in different ways and arranged if necessary according to another configuration in the adjustment system, in particular with regard to the attachment points on the support (9), the shape of the stops (19, 19') or of the rocker (14), or even the amplitude of the hydraulic jack or jacks (13, 13a, 13b), without departing from the scope of the invention.

The preceding description of the invention relates to a windrowing rotor (5) carried by a lateral support arm (2), it is, however, entirely possible to envisage machines of great width with several rotors (5) carried by a single arm (2), without departing from the scope of the invention.

Of course, the invention is not limited to the embodiments described and represented by way of example, but it also includes all the technical equivalents and the combinations thereof.

The invention claimed is:

1. A haymaking machine, or a windrower, for plants lying on the ground, comprising:
   a support structure including a main beam on which is articulated at least one lateral arm supporting at least one windrowing rotor,
   wherein the rotor is connected to a support device forming an interface with a support mounted on the lateral arm,
   wherein the support device allows displacements for the rotor so as to follow movements of the terrain when the machine is in operation and is in a work position,
   wherein the support device comprises an adjustment system which limits an amplitude of movements of the rotor in the work position and which blocks movements of the rotor in an elevated position and in a transport position, and
   wherein the adjustment system which limits the movements of the rotor comprises a control means including at least one hydraulic jack and a connecting device movable by the at least one hydraulic jack.

2. A haymaking machine according to claim 1, wherein the at least one hydraulic jack is connected to the rotor by the connecting device and to the support.

3. A haymaking machine according to claim 1, wherein the support device comprises a first axis directed in a direction of advance.

4. A haymaking machine according to claim 3, wherein the support device comprises a second axis perpendicular to the direction of advance.

5. A haymaking machine according to claim 2, wherein the connecting device comprises a rocker articulated with the support, movable by the hydraulic jack.

6. A haymaking machine according to claim 5, wherein the rocker comprises an axis which is engaged in a housing of oblong shape provided in a lug articulated on the rotor so as to limit pivoting movements around the first axis.

7. A haymaking machine according to claim 6, wherein action of the hydraulic jack in contraction causes the rotor to pivot in a direction of the main beam around the first axis.

8. A haymaking machine according to claim 2, wherein the connecting device is formed by an articulation and the hydraulic jack is arranged in a plane passing through the first axis.

9. A haymaking machine according to claim 4, wherein action of the hydraulic jack in contraction causes the rotor to pivot around the second axis.

10. A haymaking machine according to claim 2, wherein the connecting device is formed by articulations and the control means comprises a first hydraulic jack and a second hydraulic jack each connected by one of the articulations to the rotor.

11. A haymaking machine according to claim 10, wherein the first hydraulic jack is arranged in a plane passing through the first axis and the second hydraulic jack is arranged in a plane passing through the second axis.

12. A haymaking machine according to claim 11, wherein action of the first hydraulic jack in contraction causes the rotor to pivot around the second axis and action of the second hydraulic jack in contraction causes the rotor to pivot in a direction of the main beam around the first axis.

13. A haymaking machine according to claim 2, wherein the connecting device is formed by an articulation and the hydraulic jack is arranged in an oblique plane with respect to a direction of advance.

14. A haymaking machine according to claim 4, wherein action of the hydraulic jack in contraction causes the rotor to pivot in a direction of the main beam simultaneously around the first axis and around the second axis.

15. A haymaking machine according to claim 1, wherein the adjustment system comprises stops between the rotor and the support to limit pivoting movements and the first axis.

16. A haymaking machine according to claim 1, wherein the adjustment system comprises a stop means between the rotor and the support to limit pivoting movements around the second axis, which stop means comprises at least one stop.

17. A haymaking machine according to claim 1, wherein a folding jack of the lateral arm of the rotor is arranged between a connecting element with the main beam and substantially an end of the lateral arm, so as to make movement of the lateral arm between a position inclined towards the ground and a transport position in which the lateral arm is situated substantially vertically with respect to the ground possible, the movement being carried out in a rotation around the axis.

18. A haymaking machine according to claim 17, wherein the folding jack and the hydraulic jack or jacks of the control means are synchronized such that the movement of the lateral arm towards the vertical position brings about a movement in contraction of the hydraulic jack or jacks allowing to block possible movements of the rotor.

19. A haymaking machine according to claim 18, wherein a partial folding of the folding jack to bring the lateral arm into a substantially horizontal position with respect to the ground leads to a contraction of the hydraulic jack or jacks to bring the rotor in a likewise substantially horizontal position, raised above the ground, to allow to pass over an obstacle.

20. A haymaking machine according to claim 17, wherein the folding jack and the hydraulic jack or jacks of the control means are synchronized such that movement of the lateral arm towards the work position brings about a movement in lengthening of the hydraulic jack or jacks to unblock the rotor.

* * * * *